C. & E. LUDVIGSEN.
METHOD OF FORMING HORSESHOE CALKS.
APPLICATION FILED APR. 30, 1908.
937,314.
Patented Oct. 19, 1909.
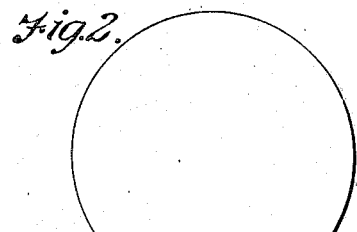
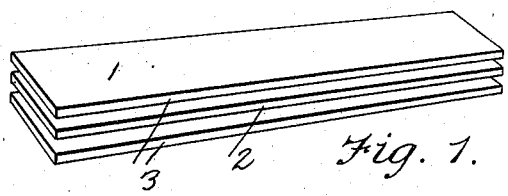
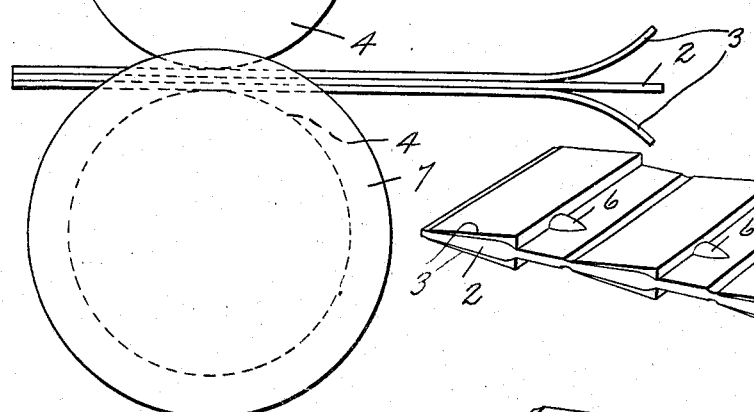
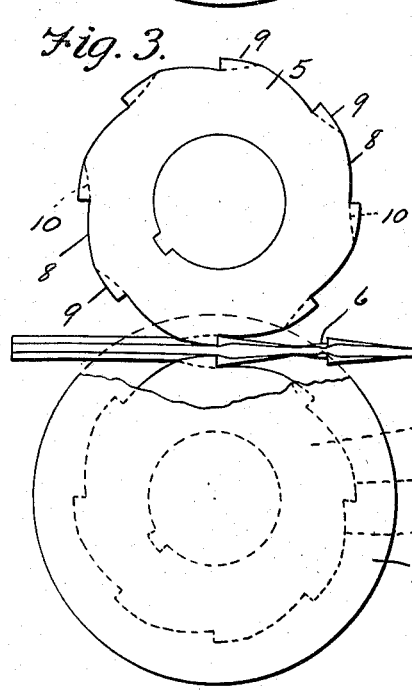
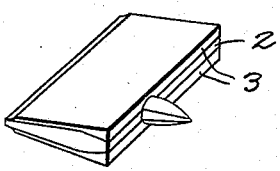
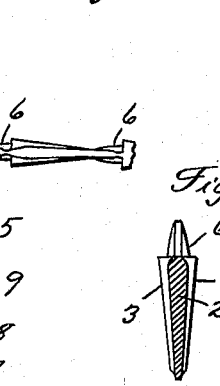
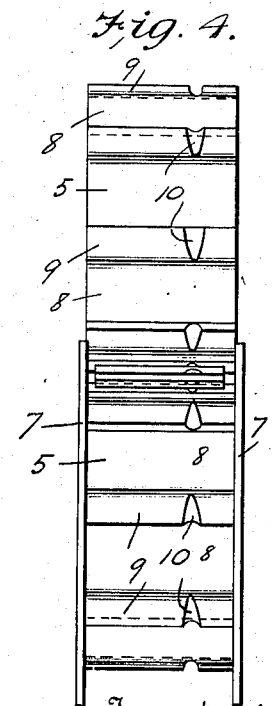
Witnesses
George Hilton
C. H. Griesbauer.
Inventors
Christ Ludvigsen
and Erick Ludvigsen
by H. A. Wilson & Co.
Attorneys

UNITED STATES PATENT OFFICE.

CHRISTIAN LUDVIGSEN AND ERICK LUDVIGSEN, OF JACKSON, MINNESOTA.

METHOD OF FORMING HORSESHOE-CALKS.

937,314.  Specification of Letters Patent.  Patented Oct. 19, 1909.

Application filed April 30, 1908. Serial No. 430,204.

*To all whom it may concern:*

Be it known that we, CHRISTIAN LUDVIGSEN and ERICK LUDVIGSEN, citizens of the United States of America, residing at Jackson, in the county of Jackson and State of Minnesota, have invented certain new and useful Improvements in Methods of Forming Horseshoe-Calks; and we do declare the following to be a full, clear, and exact description of the invention, such as will enable others skilled in the art to which it appertains to make and use the same.

Our invention relates to the method of forming horse shoe calks.

The object of the invention is to reduce the expense in the manufacture of horse shoe calks and to make the calk so that the intermediate layer of hard steel is bulged within the calk whereby the parts when welded together are firmly held in place.

A further object of the invention is to eliminate all soft metal between the calks, in the connecting portion in the strip between the toe and the heel of the calk.

With the foregoing and other objects in view the invention consists of certain novel features, as will be more fully described and particularly pointed out in the appended claims.

In the drawings which accompany this specification, Figure 1 is a perspective view of the iron and steel plates forming the calk bar showing their relative arrangement before being welded together; Fig. 2 is an edge view of the same showing the apparatus and manner in which the plates or bars are welded; Fig. 3 is a similar view showing the means for shaping the calks on the bar; Fig. 4 is a front view of the shaping rolls with the bar arranged in operative position between them; Fig. 5 is a perspective view of the bar after the plates have been welded together and the calks formed or shaped thereon; and Fig. 6 is a similar view of a calk after it has been severed from the bar; Fig. 7 is a vertical cross sectional view of the completed calk.

In the preferred apparatus used to carry out our method a bar 1 is used from which the calks are made consisting of a central plate or layer 2 of hard metal, preferably steel, and outer layers 3 of softer metal, preferably iron, said plates or layers of steel and iron being of a width corresponding to the length of the calks.

In forming the bar 1, the plates 2 and 3 may first be welded together by means of suitable rollers as 4 after which the bar is run through another set of specially constructed shaping rollers 5 by means of which a series of calks is formed or shaped in the bar and the calks are afterward sheared or severed apart and dressed off in condition for use.

When the calks are being shaped in the bar 1, an attaching lug or point 6 is formed on the inner edges of the same by the shaping rolls 5, said point being left projecting from the edge of the calks when the same are sheared apart and which is adapted to facilitate the welding of the calk to the toe of the shoe.

In the steel pointed calks now ordinarily in use it is necessary for the blacksmith to weld the parts thereof together before or after they are applied to the shoe whereas in the calks formed as herein described, the outer plates of iron and the intermediate steel plate are welded together before or during the process of manufacturing the calk thereby saving an immense amount of time and labor when the calks are applied to the shoe.

One each of the welding rolls 4 and the shaping rolls 5 is preferably provided at its opposite ends with plates 7 which project beyond the periphery of the roll and form guides for the bar to be passed therebetween. The welding rolls 4 are made with smooth peripheries and the shaping rolls 5 have a plurality of dies as 8 formed on their peripheries and extending transversely thereacross. These rolls 5 are arranged in pairs and the dies on one roll are disposed in position to co-act with those on the other roll to form completed calks on the bar passing between them. These rolls 5 are made in the form of ratchet wheels, the dies or teeth 8 thereof which extend transversely across the periphery of the rolls, have their tops concentric with the axis of the rolls as shown at 9 and the inclined sides thereof terminating at the base of the straight side of the adjacent die or tooth.

The width of the rolls corresponds to the width of the bar to be passed therebetween and on which the calks are formed transversely, the length of the calks being equal to the width of the bar. These dies or teeth 8 are each provided with a transversely extending recess as 10 made deeper at the thick side of the teeth and they are arranged in circumferential alinement, those in the teeth of one roll being arranged to register with those of the teeth of the other roll and between which the attaching lugs 6 of the calks are formed. When the shaping rolls are assembled in operative position as shown in Figs. 3 and 4 of the drawing, they are so mounted that the tops of the dies or teeth of one roll are arranged to register with those of the other roll and the two co-acting rolls being connected to rotate simultaneously at the same speed continue in this relation during each complete revolution, thereby forming calks of the same contour on each side.
As the strips pass through or between the rolls the tops of the teeth being relatively close together upon the separate rolls, as each successive calk is formed the outer layers of softer metal are forced or rolled off the hard layer of steel and the iron is thereby eliminated between the heel of one calk and the toe of the next succeeding calk. The metal thus eliminated is forced up into the heel of the next succeeding calk and the pressure upon the steel slightly bulges the same within the center of the succeeding calk between the outer layers of iron, so that displacement of the parts is prevented and so that the wearing quality of the calk is proportionately enhanced in value as the calk wears down, owing to the fact that a greater quantity of hard metal is exposed proportionately as the calk is worn.

In the operation of forming the calks, the bars preferably pass through the welding rolls 4 in one direction and pass back through the shaping rolls 5 in an opposite direction.

From the foregoing description, taken in connection with the accompanying drawings, persons skilled in the art will be able to manufacture calks of this character under the method described.

Having thus described our invention, what we claim is:—
1. The method of forming a series of connected horse shoe calks which consists in the following steps connecting in parallel relation a plurality of layers of hard and soft metal strips with the soft layers arranged on either side of the hard strip, and subjecting the pile, while hot, to the pressure of roller dies sufficient to form a series of calks with the inner hard strip bulged in each calk between the heel and toe thereof and with the soft metal tapering from the heel to the toe of each calk and substantially eliminated between the calks.

2. The method of forming a series of connected horse shoe calks which consists in the following steps connecting in parallel relation a plurality of layers of hard and soft metal strips with the soft layers arranged on either side of the hard strip, and subjecting the pile, when hot, to the action of dies to form a series of calks with the inner hard strip bulged in each calk between the heel and toe thereof and with the soft metal tapering from the heel to the toe of each calk and substantially eliminating the soft metal between the calks by rolling pressure.

3. The method of forming a series of connected horse shoe calks which consists in connecting together, a plurality of layers of soft metal and a layer of hard metal and subjecting the pile when hot to the action of dies to form a series of calks, with the soft metal tapering from the heel to the toe of each calk and substantially eliminating the soft metal between the calks by rolling pressure.

In testimony whereof we have hereunto set our hands in presence of two subscribing witnesses.

CHRISTIAN LUDVIGSEN.
  ERICK LUDVIGSEN.

Witnesses:
 F. B. Faber,
 T. J. Knox.